(12) United States Patent
Hayashi et al.

(10) Patent No.: US 9,745,491 B2
(45) Date of Patent: Aug. 29, 2017

(54) METHOD FOR PRODUCING CROSSLINKED POLYMER, CROSSLINKED POLYMER, AND COATING COMPOSITION CONTAINING THE SAME

(71) Applicants: Yumiko Hayashi, Hirakata (JP); Sachiko Morimoto, Hirakata (JP); Manabu Yamaoka, Hirakata (JP); Naoya Yabuuchi, Hirakata (JP)

(72) Inventors: Yumiko Hayashi, Hirakata (JP); Sachiko Morimoto, Hirakata (JP); Manabu Yamaoka, Hirakata (JP); Naoya Yabuuchi, Hirakata (JP)

(73) Assignee: NIPPON BEE CHEMICAL CO., LTD., Hirakata, Osaka (JP)

( * ) Notice: Subject to any disclaimer, the term of this patent is extended or adjusted under 35 U.S.C. 154(b) by 333 days.

(21) Appl. No.: 14/141,933

(22) Filed: Dec. 27, 2013

(65) Prior Publication Data

US 2014/0187710 A1    Jul. 3, 2014

(30) Foreign Application Priority Data

Dec. 27, 2012  (JP) ................................. 2012-285408
Jun. 20, 2013  (JP) ................................. 2013-129945

(51) Int. Cl.

| C08L 33/14 | (2006.01) |
| C09D 133/06 | (2006.01) |
| C08L 31/00 | (2006.01) |
| C08L 33/06 | (2006.01) |
| C08L 31/06 | (2006.01) |
| C08L 31/02 | (2006.01) |

(52) U.S. Cl.
CPC .......... *C09D 133/066* (2013.01); *C08L 31/00* (2013.01); *C08L 31/02* (2013.01); *C08L 31/06* (2013.01); *C08L 33/062* (2013.01); *C08L 33/064* (2013.01); *C08L 33/066* (2013.01); *C08L 33/14* (2013.01); *C08L 2312/06* (2013.01)

(58) Field of Classification Search
CPC .......... C08L 31/00; C08L 31/02; C08L 31/06; C08L 33/062; C08L 33/064; C08L 33/066; C08L 33/14
See application file for complete search history.

(56) References Cited

U.S. PATENT DOCUMENTS 6,586,097 B1 * 7/2003 Pascault .................. C08F 2/14
                                                                  428/402
6,858,299 B2   2/2005 Lundquist et al.

FOREIGN PATENT DOCUMENTS

| CN | 101307118 A | 11/2008 |
| JP | 2001-131219 A | 5/2001 |
| JP | 2003-223302 A | 8/2003 |
| JP | 2004-131690 A | 4/2004 |
| JP | 3999746 B2 | 10/2007 |

OTHER PUBLICATIONS

Abstract of a Chinese Office Action dated Oct. 10, 2016.
English translation of CN 101307118 A.

* cited by examiner

*Primary Examiner* — Peter D Mulcahy
(74) *Attorney, Agent, or Firm* — Ladas & Parry LLP

(57) ABSTRACT

The object of the present disclosure is to provide a method for producing a crosslinked polymer by radical polymerization of a monomer composition, by which method a desired crosslinked polymer can be produced in a high solid content with good productivity (also at a low production cost), and a crosslinked polymer obtained by the production method and a coating composition containing the same.

A method for producing a crosslinked polymer having a weight average molecular weight of 15000 to 200000, the method comprising step [I] of obtaining a crosslinked polymer (A) by conducting polymerization of a monomer composition comprising 2 to 30% by weight of a polyfunctional methacrylate having 2 to 4 functional groups (a) and 98 to 70% by weight of one or more polymerizable monomers selected from the group consisting of monofunctional (meth)acrylates, (meth)acrylic acid, and monofunctional vinyl aromatic compounds (b) in an organic solvent in the presence of a radical polymerization initiator in a temperature region where the radical polymerization initiator comes to have a half-life of 4 to 18 minutes.

20 Claims, No Drawings

METHOD FOR PRODUCING CROSSLINKED POLYMER, CROSSLINKED POLYMER, AND COATING COMPOSITION CONTAINING THE SAME

TECHNICAL FIELD

The present invention relates to a method for producing a crosslinked polymer, and particularly to a method for producing a crosslinked polymer which method can afford a crosslinked polymer by radical polymerization of a monomer composition. Moreover, the present invention relates to a crosslinked polymer obtained by this production method and a coating composition containing the same.

BACKGROUND OF THE DISCLOSURE

Crosslinked polymers typified by crosslinked (meth)acrylic polymers are used for various applications, such as various coating compositions (as a binder or a filler), an adhesive component, an electronics-related material, a controlled release mechanism of a medicinal composition, and a resin composite material. While crosslinked polymers can be prepared, for example, in the form of polymer particles via a polymerization method of a monomer composition containing polyfunctional monomers, such as emulsion polymerization, dispersion polymerization, suspension polymerization, precipitation polymerization, and solution polymerization (see, for example, Patent Document 1), it has problematically not been possible to increase the solid content (concentration) of a crosslinked polymer in a resulting crosslinked polymer solution especially in preparation by solution polymerization. Namely, there was a problem that an attempt to achieve a high solid content results in the occurrence of gelation, which inhibits obtaining a desired crosslinked polymer (polymer particles) or inhibits use for a desired application.

As a means for solving the above-mentioned problem, Patent Document 2 discloses that a reaction material comprising a monomer, a crosslinking agent, and a polymerization initiator is added to a heated solvent by using a pulse addition method in a method for preparing crosslinked polymer nanoparticles made of a (meth)acrylic crosslinked polymer by solution polymerization (Claim 1, Examples 1 and 2, etc.). The pulse addition method is a method in which a time zone during which part of the reaction material is added and a time zone during which the reaction material is not added are repeated until the addition of the whole amount of the reaction product is completed.

Patent Document 3 discloses a resin prepared using a monomer having plural α,β-unsaturated double bonds in a high solid concentration. The resin disclosed in Patent Document 3, however, cannot afford a sufficient effect with respect to weatherability when being used as a coating because the resin does not have a satisfactorily high molecular weight. Patent reference 3 causes a problem that a resin having a satisfactorily high molecular weight cannot be obtained because a reaction is conducted within a temperature region such that the half-life of a radical polymerization initiator is short.

Patent document 4 discloses a resin prepared using a monomer having plural α,β-unsaturated double bonds in silicone oil. However, the resin obtained by reacting the monomer in the silicone oil is unusable for coating compositions as it is, a problem such as a repelling occurs when the resin is incorporated. A step of removing the silicone oil to be used as a medium is disclosed, but performing this step results in an increase in steps and in costs.

PRIOR TECHNICAL DOCUMENT

Patent Document

[Patent Document 1] Japanese Kokai Publication 2004-131690
[Patent Document 2] Specification of JP Patent No. 3999746
[Patent Document 3] Japanese Kokai Publication Hei01-131219
[Patent Document 4] Japanese Kokai Publication Hei03-223302

SUMMARY OF INVENTION

Problem to be Solved by the Invention

The pulse addition method disclosed in the above-mentioned Patent Document 2 can increase the solid content of a crosslinked polymer (polymer nanoparticles) solution, but the method was disadvantageous in production efficiency and production cost because a reaction material is required to be added intermittently while providing a time zone during which the reaction material is not added.

The present invention was devised in order to solve the above-described problems and an object thereof is to provide a method for producing a crosslinked polymer via radical polymerization of a monomer composition, by which method a desired crosslinked polymer can be produced in a higher solid content with higher productivity (and at a lower production cost). Another object of the present invention is to provide a crosslinked polymer obtained by the above-mentioned production method and a coating composition containing the same.

Means for Solving Object

The present invention includes the following:

[1] A method for producing a crosslinked polymer having a weight average molecular weight of 15000 to 200000, the method comprising step [I] of obtaining a crosslinked polymer (A) by conducting polymerization of a monomer composition comprising 2 to 30% by weight of a polyfunctional methacrylate having 2 to 4 functional groups (a) and 98 to 70% by weight of one or more polymerizable monomers selected from the group consisting of monofunctional (meth)acrylates, (meth)acrylic acid, and monofunctional vinyl aromatic compounds (b) in an organic solvent in the presence of a radical polymerization initiator in a temperature region where the radical polymerization initiator comes to have a half-life of 4 to 18 minutes.

[2] The production method according to [1], wherein the concentration of the crosslinked polymer in the reaction liquid after the completion of the step (I) is 45% by weight or more.

[3] The production method according to [1] or [2], wherein the one or more polymerizable monomers selected from the group consisting of monofunctional (meth)acrylates, (meth)acrylic acid, and monofunctional vinyl aromatic compounds (b) comprises a compound selected from the group consisting of (meth)acrylates having a molecular weight of less than 160, (meth)acrylic acid, and styrene in an amount of 82% by weight or more.

[4] The production method according to any one of [1] to [3], wherein the crosslinked polymer has one or more kinds of functional group selected from the group consisting of a hydroxy group and a carboxyl group and the content of the functional group is 10 to 160 mgKOH/g as expressed in hydroxyl value or acid value.

[5] The production method according to any one of [1] to [4], wherein the organic solvent is a solvent capable of dissolving the monomer composition and the crosslinked polymer.

[6] The production method according to any one of [1] to [5], wherein the method further comprises step [II] of obtaining an active energy ray-curable crosslinked polymer (B) by reacting a compound having a reactive functional group capable of undergoing addition reaction to the crosslinked polymer (A) and a radically polymerizable double bond (c) with the crosslinked polymer (A) after the step [I].

[7] A crosslinked polymer that is a crosslinked polymer (A) obtained by the production method according to any one of [1] to [5] or a crosslinked polymer (B) obtained by the production method according to [6].

[8] A crosslinked polymer-containing liquid comprising a crosslinked polymer (A) or a crosslinked polymer (B) obtained by the production method according to any one of [1] to [6].

[9] A coating composition comprising a crosslinked polymer according to [7] or a crosslinked polymer-containing liquid according to [8].

Effect of the Invention

According to the production method of the present invention, a desired crosslinked polymer can be produced in a higher solid content and with higher productivity (and at a lower production cost). Namely, a crosslinked polymer can be produced efficiently in a shorter time because it is not necessarily required to use the pulse addition method disclosed in Patent Document 2.

The crosslinked polymer of the present invention is advantageous in storageability, transferability, handleability, etc. because it can be obtained in the form of a crosslinked polymer-containing liquid with a high solid content (a high concentration). In the use of the crosslinked polymer (or the crosslinked polymer-containing liquid) of the present invention, for example, as a resin component (a binder resin) of a coating composition, a higher concentration of resin components (a reduced amount of solvent) in a coating composition can be achieved, so that a coating composition that contains a reduced amount of organic solvent and that is friendly to the environment can be provided.

The crosslinked polymer (or the crosslinked polymer-containing liquid) of the present invention can be high in solid content and also has properties advantageous for various applications due to the method for its production. For example, the crosslinked polymer (or the crosslinked polymer-containing liquid) of the present invention as a resin component (a binder resin) of a coating composition can form a coating film that is superior in adhesion to a coated object, adhesion to an adjoining coating film, water resistance, and strength. The crosslinked polymer of the present invention is also superior in curability in the case of curing using a curing agent and in active energy ray-curability in the case where the crosslinked polymer is active energy ray-curable. Moreover, a coating composition produced using the crosslinked polymer of the present invention can have good performance also in gloss or color tone.

DETAILED DESCRIPTION OF PREFERRED EMBODIMENTS

<Method for Producing a Crosslinked Polymer, and Crosslinked Polymers (A) and (B)>

The present invention relates to a method for producing a crosslinked polymer (A) via radical polymerization of a monomer composition comprising a polyfunctional monomer and a monofunctional monomer in an organic solvent. The production method of the present invention has the following step [I]:

a step of obtaining a crosslinked polymer (A) by conducting polymerization of a monomer composition comprising 2 to 30% by weight of a polyfunctional methacrylate having 2 to 4 functional groups (a) and 98 to 70% by weight of a monofunctional monomer having a radically polymerizable double bond in an organic solvent in the presence of a radical polymerization initiator in a temperature region where the radical polymerization initiator comes to have a half-life of 4 to 18 minutes.

A "polyfunctional monomer" means any monomer that has two or more radically polymerizable double bonds in each molecule and a "monofunctional monomer" means any monomer that has one radically polymerizable double bond in each molecule. The "monomer composition" as used herein shall comprise only a monomer component (namely, a polyfunctional monomer and a monofunctional monomer).

(1) Polyfunctional Methacrylate having 2 to 4 Functional Groups (a)

In the present invention, the monomer composition, the raw material, comprises a polyfunctional methacrylate having 2 to 4 functional groups (a) (henceforth sometimes referred also as a "polyfunctional methacrylate (a)") as a polyfunctional monomer. A "polyfunctional methacrylate having 2 to 4 functional groups" means any compound having 2 to 4 methacryloyl groups in each molecule. Thus, it is important in the present invention to use a polyfunctional methacrylate (a) as a polyfunctional monomer. When the polyfunctional monomer is composed only of a polyfunctional acrylate, gelation will occur in a polymerization reaction liquid when trying to obtain a high-solids crosslinked polymer (A). In contrast to this, the use of a polyfunctional methacrylate (a) can prevent such gelation effectively. This is presumably because polymer particles formed via polymerization are prevented from uniting together by some factor.

Examples of a methacrylate having 2 functional groups include 1,4-butanediol dimethacrylate, 1,3-butanediol dimethacrylate, 1,6-hexanediol dimethacrylate, ethylene glycol dimethacrylate, diethylene glycol dimethacrylate, triethylene glycol dimethacrylate, polyethylene glycol dimethacrylate, dipropylene glycol dimethacrylate, tripropylene glycol dimethacrylate, polypropylene glycol dimethacrylate, neopentyl glycol dimethacrylate, neopentylglycol hydroxypivalate dimethacrylate, 1,6-hexanediol dimethacrylate, 1,9-nonanediol dimethacrylate, 1,10-decanediol dimethacrylate, glycerol dimethacrylate, and dimethylol tricyclodecane dimethacrylate. Especially, ethylene glycol dimethacrylate, diethylene glycol dimethacrylate, etc. can be used preferably.

Examples of methacrylates having three functional groups include trimethylolmethane trimethacrylate, trimethylolpropane trimethacrylate, trimethylolpropane ethylene oxide-modified trimethacrylate, trimethylolpropane propylene oxide-modified trimethacrylate, pentaerythritol trimethacrylate, glycerol propoxy trimethacrylate, and tris(2-methacryloyloxyethyl)isocyanurate. Especially, trimethylolpropane trimethacrylate, pentaerythritol trimethacrylate, etc. can be used preferably.

Examples of methacrylates having four functional groups include dipentaerythritol tetramethacrylate, pentaerythritol tetramethacrylate, pentaerythritol ethylene oxide-modified tetramethacrylate, pentaerythritol propylene oxide-modified tetramethacrylate, and ditrimethylolpropane tetramethacrylate. Especially, ditrimethylolpropane tetramethacrylate, pentaerythritol tetramethacrylate, etc. can be used preferably. The polyfunctional methacrylate (a) may be used singly or alternatively may be used in a combination of two or more species thereof.

The content of the polyfunctional methacrylate (a) in a monomer composition is 2 to 30% by weight, preferably 3 to 25% by weight, more preferably 5 to 20% by weight, where the whole monomer composition is taken as 100% by weight. Adjusting the content of the polyfunctional methacrylate (a) to within such a range makes it possible to obtain a high-solids crosslinked polymer (A) having preferable physical properties without causing gelation. If the content of the polyfunctional methacrylate (a) exceeds 30% by weight, an attempt to obtain a high-solids crosslinked polymer (A) will result in gelation of a polymerization reaction liquid. If the content of the polyfunctional methacrylate (a) is less than 2% by weight, physical properties preferable as a crosslinked polymer are hard to obtain because of the low numbers of crosslinkabe sites.

The monomer composition may contain an additional polyfunctional monomer other than the polyfunctional methacrylate (a), but the amount thereof is preferably as small as possible from the viewpoint of preventing gelation. The usage amount of such an additional polyfunctional monomer is, for example, 50% by weight or below of the polyfunctional methacrylate (a), preferably 20% by weight or below, more preferably 10% by weight or below, particularly preferably 0% by weight.

Examples of the additional polyfunctional monomer include polyfunctional methacrylates having 5 or more functional groups, such as dipentaerythritol hexamethacrylate and dipentaerythritol pentamethacrylate, and polyfunctional acrylates corresponding to the above-mentioned polyfunctional methacrylate (a).

(2) One or More Kinds of Polymerizable Monomer Selected from the Group Consisting of Monofunctional (Meth)Acrylates and Monofunctional Vinyl Aromatic Compounds (b)

One or more kinds of polymerizable monomer selected from the group consisting of monofunctional (meth)acrylates and monofunctional vinyl aromatic compounds (b) (henceforth also referred merely to as "monofunctional monomer (b)" is a monofunctional (meth)acrylate or a vinyl group-containing aromatic compound having one unsaturated bond.

Examples of the monofunctional (meth)acrylate include methyl (meth)acrylate, ethyl (meth)acrylate, propyl (meth) acrylate, isopropyl (meth)acrylate, n-butyl (meth)acrylate, isobutyl (meth)acrylate, tert-butyl (meth)acrylate, hexyl (meth)acrylate, 2-ethylhexyl (meth)acrylate, lauryl (meth) acrylate, stearyl (meth)acrylate, cyclohexyl (meth)acrylate, benzyl (meth)acrylate, isobornyl (meth)acrylate, polyethylene glycol mono(meth)acrylate, polypropylene glycol mono (meth)acrylate, methoxyethylene glycol (meth)acrylate, methoxyethyl (meth)acrylate, ethoxyethyl (meth)acrylate, methoxy polyethylene glycol (meth)acrylate, methoxypolypropylene glycol (meth)acrylate, 2-hydroxyethyl (meth) acrylate, 2-hydroxypropyl (meth)acrylate, 2-hydroxybutyl (meth)acrylate, hydroxyethyl (meth)acrylate, glycidyl (meth)acrylate, methylglycidyl (meth)acrylate, dimethylaminoethyl (meth)acrylate, diethylaminoethyl (meth)acrylate, and modifications (derivatives) thereof [e.g., ethylene oxides, propylene oxides, γ-butyrolactone- or ε-caprolactone-adducts, of hydroxyl group-containing (meth)acrylates, such as 2-hydroxylethyl (meth)acrylate, 2-hydroxypropyl (meth)acrylate, and 2-hydroxybutyl (meth)acrylate], trifluoroethyl (meth)acrylate, polydimethylsiloxane macromers, and γ-(meth)acryloxypropyltrimethoxysilane. Moreover, (meth)acrylic acid can also be used as the component (b).

When using a hydroxyl group-containing (meth)acrylate as the monofunctional (meth)acrylate (b), it is preferably incorporated in a proportion such that the resulting resin comes to have a hydroxyl value of 10 to 160 mgKOH/g. In the case of use as a resin for coating, a curing reaction can be properly conducted by adjusting the hydroxyl value to within the range. Moreover, there can be employed a reactive functional group in the case of subjecting the resulting resin to Step (II) described in detail below.

When using (meth)acrylic acid as the component (b), it is preferably incorporated in a proportion such that the resulting resin comes to have an acid value of 10 to 160 mgKOH/g. In the case of use as a resin for coating, a curing reaction can be properly conducted by adjusting the acid value to within the range. Moreover, there can be employed a reactive functional group in the case of subjecting the resulting resin to Step (II) described in detail below.

When using an epoxy group-containing (meth)acrylate as the monofunctional (meth)acrylate (b), it is preferably incorporated in a proportion such that the resulting resin comes to have an epoxy equivalent weight of 200 to 3000. In the case of use as a resin for coating, a curing reaction can be properly conducted by adjusting the epoxy equivalent weight to within the range. Moreover, there can be employed a reactive functional group in the case of subjecting the resulting resin to Step (II) described in detail below.

Examples of the monofunctional vinyl compound include vinyl aromatic compounds, such as styrene, vinyltoluene, p-methylstyrene, α-methylstyrene, p-tert-butylstyrene, and vinylpyridine, as well as other vinyl monomers, such as N-vinylpyrrolidone, vinyl chloride, vinyl acetate, hydroxybutyl vinyl ether, lauryl vinyl ether, cetyl vinyl ether, and 2-ethylhexyl vinyl ether, and modifications (derivatives) thereof.

The content of the monofunctional monomer (b) in a monomer composition is 98 to 70% by weight, preferably 97 to 75% by weight, more preferably 95 to 80% by weight, where the whole monomer composition is taken as 100% by weight. It is more preferred that all the remainder other than the polyfunctional methacrylate (a) in the monomer composition is the monofunctional monomers (b).

Preferably, the monofunctional monomer (b) is a compound selected from the group consisting of a (meth)acrylate having a molecular weight of less than 160, (meth)acrylic acid, and styrene in an amount of 82% by weight or more relative to the overall amount of the monofunctional monomer (b). In some cases where a monofunctional monomer having an excessively large molecular weight has been used, it becomes difficult to attain a sufficiently increased molecular weight due to the steric hindrance of the monomer. The proportion of the compound selected from the group consisting of a (meth)acrylate having a molecular weight of less than 160, (meth)acrylic acid, and styrene is more preferably 90% by weight or more, and the whole amount of the monofunctional monomer (b) may be a compound selected from the group consisting of a (meth)acrylate having a molecular weight of less than 160, (meth)acrylic acid, and styrene.

In the present invention, an additional monomer other than the polyfunctional methacrylate (a) and the monofunctional monomer (b) (henceforth referred to as "additional monomer (c)") may be contained. Examples of the additional monomer (c) include carboxyl group-containing monofunctional monomers other than (meth)acrylic acid, monofunctional (meth)acrylamide compounds, (meth)acrylonitrile, maleimide, and maleimide derivatives. Examples of the carboxyl group-containing monofunctional monomers other than (meth)acrylic acid that can be used as the additional monomer (c) include itaconic acid, maleic acid, and their modifications (derivative). In the case of using a carboxyl group-containing monofunctional monomer, it is preferred to use it in a proportion such that the resulting resin has an acid value of 10 to 160 mgKOH/g.

Examples of the monofunctional (meth)acrylamide compound that can be used as the additional monomer (c) include (meth)acrylamide, diacetone(meth)acrylamide, isobutoxymethyl(meth)acrylamide, N,N-dimethyl (meth)acrylamide, N,N-diethyl (meth)acrylamide, N-isopropyl (meth)acrylamide, tert-octyl(meth)acrylamide, N,N-dimethylaminopropyl (meth)acrylamide, and their modifications (derivative). Examples of maleimide derivatives include N-phenylmaleimide, N-cyclohexylmaleimide, and N-butylmaleimid.

The content of the additional monofunctional monomer (c) is preferably a proportion of 15% by weight or below, more preferably 10% by weight or below, even more preferably 5% by weight or below.

(3) Radical Polymerization

In the present invention, radical polymerization of the above-mentioned monomer composition is performed in the presence of a radical polymerization initiator in an organic solvent within a predetermined temperature region (Step [I]). Specifically, a method in which, although not particularly limited, a mixture composed of a monomer composition, a radical polymerization initiator, and an organic solvent, which is optionally added, is added to an organic solvent contained in a reaction vessel and conditioned within a predetermined temperature region is suitably adopted. While the addition may be continuous addition (dropping, etc.) or alternatively may be pulse addition like that disclosed in Patent Document 2, continuous addition is preferred from the viewpoints of production efficiency and production cost.

The temperature at which the radical polymerization is conducted (i.e., the reaction temperature) is set to within a temperature region such that the half-life of the radical polymerization initiator to be used becomes 4 to 18 minutes. Preferred is a temperature range that affords a half-life of 6 to 16 minutes, and more preferred is a temperature region that affords a half-life of 8 to 14 minutes. Conducting radical polymerization in such a temperature region can afford a high-solids crosslinked polymer (A) without causing gelation even if the above-mentioned mixture is added continuously. While the reason why gelation is successfully prevented is not clear, to use a temperature region such that the half-life of a radical polymerization initiator becomes 18 minutes or less means to activate a radical polymerization initiator in a shorter time by conventional methods, and this is presumed to have some influence on the prevention from gelation. If radical polymerization is conducted within a temperature region such that the half-life of the radical polymerization initiator exceeds 18 minutes, gelation is prone to occur even if a polyfunctional methacrylate (a) is used. If radical polymerization is conducted within a temperature region such that the half-life of the radical polymerization initiator is shorter than 4 minutes, it is difficult to obtain a resin with a high molecular weight and therefore physical properties in use for various applications will deteriorate. The reaction temperature is usually not higher than the boiling point of the organic solvent to be used (i.e., the reflux temperature of the reaction liquid).

Although the radical polymerization may be conducted at a fixed reaction temperature or alternatively radical polymerizations at different temperature regions may be combined, radical polymerization is conducted within a temperature region such that the above-mentioned half-life becomes 18 minutes or less during at least 50%, preferably 80% or more, more preferably 90% or more of the reaction time of the radical polymerization, and more typically, radical polymerization is conducted within a temperature region such that the above-mentioned half-life becomes 4 to 18 minutes during the overall reaction time.

The half-life $t_{1/2}$ of the radical polymerization initiator as used herein is defined by the following formula:

$$t_{1/2} = (\ln 2)/k_d.$$

$k_d$ is the decomposition rate constant of the radical polymerization initiator and is defined by the following formula:

$$k_d = A \cdot \exp(-E_d/RT).$$

$E_a$ is the activation energy (kJ/mol) of the decomposition reaction of the radical polymerization initiator, A is a frequency factor ($s^{-1}$), R is the gas constant (J/mol·K), and T is a temperature (a reaction temperature, K). Therefore, the half-life $t_{1/2}$ depends only on a temperature (a reaction temperature) T and the type (the activation energy $E_a$ and the frequency factor A) of the radical polymerization initiator.

For example, the activation energy $E_a$ and the frequency factor A of tert-amyl peroxypivalate, a radical polymerization initiator, are 128 kJ/mol and $4.12 \times 10^{15}$ $s^{-1}$, respectively (source: AkzoNobel Technical Data Sheet), the half-life $t_{1/2}$ at a reaction temperature of 80° C. is 22.6 minutes, and the half-life $t_{1/2}$ at 91° C. is 6 minutes. The activation energy $E_a$ and the frequency factor A of 2,2'-azobisisobutyronitrile (AIBN), a radical polymerization initiator, are 129 kJ/mol and $1.58 \times 10^{15}$ $s^{-1}$, respectively (source: J. P. Van Hook and A. V. Tobolsky, J. Am. Chem. Soc., 80, 779 (1958)), the half-life $t_{1/2}$ at a reaction temperature of 90° C. is 26.3 minutes, and the half-life $t_{1/2}$ at 100° C. is 8.4 minutes. For other radical polymerization initiators, a half-life can be determined in a similar manner from the disclosure of known documents, etc.

Commonly used radical polymerization initiators, such as tert-amyl peroxypivalate and AIBN, can be used as the radical polymerization initiator, and examples thereof include tert-butyl peroxyacetate, tert-butyl peroxyisobutyrate, tert-butyl peroxypivalate, tert-butyl peroxyoctoate, tert-butyl peroxy-2-ethylhexanoate, tert-butyl peroxyneodecanoate, tert-amyl peroxyneodecanoate, tert-amyl peroxyoctoate, tert-amyl peroxy-2-ethylhexanoate, tert-amyl peroxyneodecanoate, tert-butyl peroxybenzoate, benzoyl peroxide, lauroyl peroxide, isobutyryl peroxide, succinic peroxide, di-tert-butyl peroxide, isobutyl peroxide, 2,2'-azobis-2,4-dimethylvaleronitrile, 2,2'-azobis-(4-methoxy-2,4-dimethylvaleronitrile), and 2,2'-azobis-2-methylbutyronitrile.

While the radical polymerization initiator may be used singly or alternatively may be used in a combination of two or more species thereof, in the case of using two or more species, it is preferred to conduct the polymerization within the temperature region such that the half-life of all the radical polymerization initiators becomes 4 to 18 minutes.

The usage amount of the radical polymerization initiator is usually about 0.5 to about 10 parts by weight, preferably 1 to 8 parts by weight, per 100 parts by weight of the monomer composition to be used.

The organic solvent is not particularly restricted so long as it can attain a temperature region within which the half-life of a radical polymerization initiator becomes 4 to 18 minutes, and examples thereof include hydrocarbons, such as toluene, xylene, ethylbenzene, cyclopentane, octane, heptane, cyclohexane, and white spirit; ethers, such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, diethylene glycol monoethyl ether, and propylene glycol monomethyl ether; esters, such as propyl acetate, butyl acetate, isobutyl acetate, benzyl acetate, ethylene glycol monomethyl ether acetate, ethylene glycol monoethyl ether acetate, propylene glycol monomethyl ether acetate, and propylene glycol monoethyl ether acetate; ketones, such as methyl ethyl ketone, ethyl isobutyl ketone, and methyl isobutyl ketone; and alcohols, such as n-butanol and propyl alcohol. The organic solvent may be used singly or alternatively may be used in a combination of two or more species thereof.

The organic solvent is preferably a solvent capable of dissolving the monomer composition, and it is more preferably a solvent capable of dissolving both the monomer composition and the crosslinked polymer (A) to be formed, namely, a solvent capable of realizing solution polymerization. By using solution polymerization, a high-solids solution of the crosslinked polymer (A) can be obtained. As such an organic solvent, butyl acetate, propylene glycol monomethyl ether, propylene glycol monomethyl ether acetate, methyl isobutyl ketone, etc. can be used preferably. The usage amount of the organic solvent to the usage amount of the monomer composition is preferably an amount such that at least the whole or almost the whole of the monomer composition can be dissolved, and is more preferably an amount such that the whole or almost the whole of the monomer composition and the crosslinked polymer (A) to be formed can be dissolved.

Meanwhile, the production method of the present invention can reduce the usage amount of an organic solvent as compared with conventional methods because the production method can increase the solid content of a resulting crosslinked polymer (A) and therefore can increase the concentration of the crosslinked polymer (A) in a reaction liquid after the completion of a radical polymerization reaction. Specifically, the usage amount of the organic solvent may be an amount such that the concentration of the crosslinked polymer (A) in the reaction liquid after the completion of the radical polymerization reaction will become 40% by weight or more, or 45% by weight or more, or 50% by weight or more, or 55% by weight or more (e.g., 60% by weight or more).

The reaction time of the radical polymerization is usually about 0.5 to about 10 hours, more typically about 1 to about 8 hours, preferably about 1 to about 6 hours.

In the production method of the present invention, a desired crosslinked polymer (A) can be obtained via the above-mentioned Step [I] in the form of a liquid containing the crosslinked polymer (A) and an organic solvent (a reaction liquid after the completion of a radical polymerization reaction). Typically, this liquid is a solution in which a crosslinked polymer (A) has been dissolved in an organic solvent. The concentration (solid content) of the crosslinked polymer (A) in the liquid is as described above. The liquid can be used as received for Step [II] described below, and it can also be used as received as one component of a composition for various applications represented by a coating composition. The crosslinked polymer (A) may be isolated by subjecting the liquid to an appropriate operation such as reprecipitation and desolventization.

The weight average molecular weight of the crosslinked polymer (A) produced via the production method of the present invention is 15000 to 200000. The crosslinked polymer (A) having the above-mentioned molecular weight can be converted into a resin with good curability and good durability when being used for such applications as coating, etc. If the weight average molecular weight is less than 15000, this is undesirable because film strength, chemical resistance, weatherability, etc. are insufficient, whereas if the weight average molecular weight exceeds 200000, this is undesirable because a coating will have an increased viscosity and therefore will become difficult to handle. The above-mentioned upper limit is more preferably 175000, even more preferably 150000. The above-mentioned lower limit is more preferably 20000, even more preferably 25000.

(4) Crosslinked Polymer (A)

In the liquid containing the crosslinked polymer (A) obtained via the above-mentioned Step [I], the crosslinked polymer (A) is expected to exist in the form of so-called "polymer nanoparticles" (dissolved in an organic solvent). It is presumed that particles of the crosslinked polymer (A) are not particles made of almost only a polymer and containing almost no water or solvent inside the particles, like polymer beads, namely, particles produced by emulsion polymerization or dispersion polymerization, but thread ball-shaped particles having plural crosslinkable sites and formed into a particle-like shape in which a solvent can move freely.

Various types of functional groups can be given to the crosslinked polymer (A) according to the application thereof. Examples of such functional groups include a carboxyl group, a hydroxyl group, an alkoxyl group, an amino group, an amide group, an epoxy group, a glycidyl group, a cyano group, a pyridine group, an isocyanate group, and a halogen group. For example, when using the crosslinked polymer (A) as a binder resin of a coating composition, it may be preferred to give a polar functional group, such as a carboxyl group, a hydroxy group, an amino group, an amide group, a cyano group, and a pyridine group, in order to improve adhesion with an object to be coated or adhesion with an adjoining coating film. The crosslinked polymer (A) may have one kind of functional group or alternatively may have two or more kinds of functional groups (of course, may not have such a functional group).

In the case of preparing a curable composition by using a curing agent, the crosslinked polymer (A) as a resin component of the curable composition is required to have a reactive functional group capable of reacting with the curing agent. The reactive functional group is selected suitably according to the type of the curing agent from among a carboxyl group, a hydroxy group, an amino group, an isocyanate group, an epoxy group, a glycidyl group, etc. Especially, a carboxyl group, a hydroxyl group, an epoxy group, and a glycidyl group are preferred, and a carboxyl group, a hydroxyl group, and a glycidyl group are more preferred. A crosslinked polymer (A) having a reactive functional group is excellent in curability in the case of curing the polymer using a curing agent and therefore can reduce the content of a curing agent in the above-mentioned curable composition as compared with conventional polymers.

As described later, the crosslinked polymer (A) can be converted into an active energy ray-curable crosslinked polymer (B) by adding thereto a compound having a radically polymerizable double bond. The crosslinked polymer (A) to be subjected to such an addition reaction is required to have a reactive functional group capable of participating in the addition reaction, such as a carboxyl group, a hydroxy group, an amino group, an isocyanate group, an epoxy group, and a glycidyl group; preferred examples of the reactive functional group include a carboxyl group, a hydroxy group, an epoxy group, and a glycidyl group.

The carboxyl group content of the crosslinked polymer (A) having a carboxyl group is usually 5 to 200 mgKOH/g-solid, preferably 10 to 160 mgKOH/g-solid as expressed in an acid value. The hydroxyl group content of the crosslinked polymer (A) having a hydroxyl group is usually 5 to 200 mgKOH/g-solid, preferably 10 to 160 mgKOH/g-solid as expressed in a hydroxyl value.

The introduction of the above-mentioned functional group to the crosslinked polymer (A) can be achieved by causing a monomer composition as a feed to include a polyfunctional methacrylate (a) having the functional group and/or a monofunctional monomer (b) having the functional group. Usually, a monofunctional monomer (b) having the above-mentioned functional group is used. Examples of such a monofunctional monomer (b) include carboxyl group-containing monofunctional monomers such as (meth)acrylic acid; hydroxy group-containing monofunctional monomers such as 2-hydroxylethyl (meth)acrylate, 2-hydroxypropyl (meth)acrylate, and ethylene oxide-, propylene oxide-, γ-butyrolactone-, or ε-caprolactone-adducts thereof; and glycidyl group-containing monofunctional monomers such as glycidyl (meth)acrylate. The above-mentioned monofunctional monomer (b) having a functional group may be used singly or alternatively may be used in a combination of two or more species thereof.

(5) Preparation of Active Energy Ray-Curable Crosslinked Polymer (B)

An active energy ray-curable crosslinked polymer (B) can be produced by adding a radically polymerizable double bond to the crosslinked polymer (A). The crosslinked polymer (B) can be prepared by conducting the following Step [II]: a step of obtaining a crosslinked polymer (B) by reacting a crosslinked polymer (A) with a compound (d) having a reactive functional group capable of undergoing an addition reaction to the crosslinked polymer (A) and a radically polymerizable double bond.

Although the crosslinked polymer (A) to be used in Step [II] may be in any form, a liquid containing the crosslinked polymer (A) obtained by Step [I] and an organic solvent (a reaction liquid just after the completion of a radical polymerization reaction) can be used suitably.

The compound (c) that is to be added to the crosslinked polymer (A) is a compound that has a radically polymerizable double bond and also has a reactive functional group capable of undergoing an addition reaction to the crosslinked polymer (A). The reactive functional group is appropriately selected from among a carboxyl group, a hydroxy group, an amino group, an isocyanate group, an epoxy group, a glycidyl group, etc. according to the type of the functional group of the crosslinked polymer (A) that takes part in the addition reaction. Especially, a carboxyl group, a hydroxyl group, an epoxy group, and a glycidyl group are preferred, and a carboxyl group, a hydroxyl group, and a glycidyl group are more preferred.

Examples of the compound (c) include carboxyl group-containing compounds, such as (meth)acrylic acid; hydroxyl group-containing compounds, such as 2-hydroxylethyl (meth)acrylate, 2-hydroxypropyl (meth)acrylate as well as their ethylene oxides, propylene oxides, and γ-butyrolactone- or ε-caprolactone-adducts; glycidyl group-containing compounds, such as glycidyl (meth)acrylate. The compound (c) may be used singly or alternatively may be used in a combination of two or more species thereof.

The addition reaction with the compound (c) can be performed by a method known in the art, for example, it can be performed in the presence of a catalyst and a polymerization inhibitor. The reaction temperature is preferably 50 to 150° C., more preferably 70 to 120° C. Examples of the catalyst include Tertiary amine, such as triethylamine and N,N-dimethylbenzylamine; halides of organic oniums, such as benzyltrimethylammonium chloride, benzyltriethylammonium chloride, benzyltriphenylphosphonium chloride, and tetrabuthylphosphonium bromide; imidazole compounds, such as 2-ethyl-4-methylimidazole; trivalent organic phosphorous compounds, such as triphenylphosphine; metal salts of organic acids, such as lithium, chromium, zirconium, potassium, or sodium salts of naphthenic acid, lauric acid, stearic acid, oleic acid, or octenoic acid. The catalyst may be used singly or alternatively may be used in a combination of two or more species thereof.

Examples of the polymerization inhibitor include hydroquinone, methoxyhydroquinone, methylhydroquinone, hydroquinone monomethyl ether, tert-butylhydroquinone, 2,5-di-tert-butylhydroquinone, benzoquinone, tert-butylcatechol, catechol, α-naphthol, nitrophenol, 2,4-di-tert-butylphenol, 4-hydroxy-2,2,6,6-tetramethylpiperidine-1-oxyl, di-tert-butyl nitroxyl, 1-oxyl-2,2,6,6-tetramethylpiperidine, 1-oxyl-2,2,6,6-tetramethylpiperidine-4-yl-acetate, 1-oxyl-2,2,6,6-tetramethylpiperidine-4-yl-2-ethylhexanoate, 1-oxyl-2,2,6,6-tetramethylpiperidine-4-yl-stearate, pyrogallol, and phenothiazine. The polymerization inhibitor may be used singly or alternatively may be used in a combination of two or more species thereof.

Typically, the reaction liquid containing a crosslinked polymer (B) obtained by conducting an addition reaction using a solution containing a crosslinked polymer (A) is a solution in which the crosslinked polymer (B) has been dissolved completely or dissolved almost completely in an organic solvent. When a high-solids liquid containing a crosslinked polymer (A) has been used, a high-solids liquid containing a crosslinked polymer (B) can be obtained. The concentration (solid content) of the crosslinked polymer (B) in the liquid containing the crosslinked polymer (B) is, for example, 40% by weight or more, and can be 45% by weight or more, or 50% by weight or more, or 55% by weight or more (60% by weight or more, or 65% by weight or more, or the like) without causing gelation.

In the liquid containing the crosslinked polymer (B) obtained via the above-mentioned Step [II] is expected to exist in the form of so-called "polymer nanoparticles" (dissolved in an organic solvent) like the liquid containing the crosslinked polymer (A). It is presumed that particles of the crosslinked polymer (B) are not particles like polymer beads but thread ball-shaped particles having plural crosslinkable sites and formed into a particle-like shape in which a solvent can move freely.

A liquid containing the crosslinked polymer (B) can be used as received as one component of a composition for various applications represented by a coating composition. The crosslinked polymer (B) may be isolated by subjecting the liquid to an appropriate operation such as reprecipitation and desolventization. A crosslinked polymer (B) is excellent in active energy ray curability and is advantageous because of its capability of reducing the usage amount of a polymerization initiator and the exposure (light exposure).

<Coating Composition>

While the crosslinked polymer (A) according to the present invention, a liquid containing the same, and the crosslinked polymer (B) and a liquid containing the same all can be used for the applications of conventional crosslinked polymers, they are suitable especially as a resin component (a binder resin) of a coating composition. They can realize a higher concentration of resin components (a reduced amount of solvent) in a coating composition and thereby afford a coating composition that contains a reduced amount of organic solvent and that is friendly to the environment. When preparing a coating composition using a liquid containing a crosslinked polymer (A) or a liquid containing a crosslinked polymer (B), it is possible to use the organic solvent contained in these liquids as at least part of the solvent component of the coating composition.

A coating composition containing a crosslinked polymer (A) can be used, for example, as a cellulose lacquer type coating, and a one-component curable or two-component curable coating. The coating composition containing the crosslinked polymer (A) can form a coating film excellent in adhesion with an object to be coated, adhesion with an adjoining coating film, water resistance, and strength. In addition, it can serve as a curable coating excellent in curability. As a curing agent to be used in combination with the crosslinked polymer (A), conventional curing agents such as isocyanate type curing agents and melamine resin-based curing agents can be used.

In the above-mentioned coating composition containing the crosslinked polymer (A), a liner polymer may be used together. Namely, the use of a linear acrylic polymer commonly used in conventional coating compositions and the above-mentioned crosslinked polymer (A) in combination can afford a favorable effect in exerting excellence in characteristics such as mechanical strength, scratch resistance, and weatherability and in preventing layer mix with an adjoining coating film.

The above-mentioned linear acrylic polymer can be prepared by polymerizing a monomer composition composed of a combination of the various monofunctional unsaturated monomers disclosed as substances that can be used for the production of the above-mentioned crosslinked polymer (A). The mixing ratio of the above-mentioned crosslinked polymer (A) to the above-mentioned linear acrylic polymer is 100:0 to 20:80 as expressed in a solid weight ratio.

A coating composition containing the crosslinked polymer (B) is used as an active energy ray-curable coating. The coating composition containing the crosslinked polymer (B) can form a coating film excellent in adhesion with an object to be coated, adhesion with an adjoining coating film, water resistance, and strength and is excellent in active energy ray-curability. A photopolymerization initiator is incorporated in the coating composition containing the crosslinked polymer (B). The photopolymerization initiator may be any of such known ones as a photopolymerization initiator.

Anyone capable of initiating, on irradiation with light, photopolymerization based on a photopolymerizable group of a photopolymerizable compound can be used as the photopolymerization initiator. Specific examples include carbonyl compounds such as benzoin, benzoin monomethyl ether, benzoin isopropyl ether, acetoin, benzil, benzophenone, p-methoxybenzophenone, diethoxyacetophenone, benzyl dimethyl ketal, 2,2-diethoxyacetophenone, 1-hydroxycyclohexyl phenyl ketone, methyl phenyl glyoxylate, ethyl phenyl glyoxylate, and 2-hydroxy-2-methyl-1-phenyl-propan-1-one, sulfur compounds such as tetramethylthiurammonosulfide and tetramethylthiuramdisulfide, and acyl phosphine oxides such as 2,4,6-trimethylbenzoyl diphenylphosphine oxide. These may be used singly or in a mixed system of two or more of them.

The amount of the photopolymerization initiator is preferably adjusted to 0.5 to 7.5% by weight of the solid content of the coating composition. Such a range makes it possible to conduct the curing of a coating properly.

In a coating composition containing the crosslinked polymer (B), an additional photopolymerizable compound may be used together. In this case, a known monofunctional and/or polyfunctional (meth)acrylate can be used as such a photopolymerizable compound. When using the crosslinked polymer (B) together with a known monofunctional and/or polyfunctional (meth)acrylate, the solid incorporated ratio (crosslinked polymer (B): known monofunctional and/or polyfunctional (meth)acrylate) in the coating composition is preferably 100:0 to 20:80.

The content of the crosslinked polymer (A) or (B) in a coating composition is usually 10 to 90% by weight, preferably 20 to 80% by weight, in 100% by weight of the solid of the coating composition. The coating composition can contain additional additives besides the above-mentioned curing agent and photopolymerization initiator. Examples of such additional additives include resins other than the crosslinked polymer (A) or (B) (e.g., thermoplastic resins such as acrylic resins, alkyd resins, and polyester resins), pigments, solvents (toluene, xylene, ethyl acetate, butyl acetate, methyl ethyl ketone, methyl isobutyl ketone, etc.), plasticizers, water binding agents, sag control agents, color separation inhibitors, antisettling agents, defoaming agents, flame retardants, UV absorbers, antioxidants, surface modifiers, viscosity-control agents, leveling agents, and pigment dispersants. Additives can be added in a combination of two or more of them.

Examples of the above-mentioned pigments include extender pigments, such as precipitated barium, talc, clay, white chalk, silica, alumina, bentonite, calcium carbonate, magnesium carbonate, silicic acid, silicates, aluminum oxide hydrates, calcium sulfate, barium sulfate, and aluminum powder (or paste); and color pigments, such as titanium oxide, zircon oxide, basic lead sulfate, tin oxide, carbon black, white lead, graphite, zinc sulfide, zinc oxide, chromium oxide, yellow nickel titanium, yellow chromium titanium, yellow iron oxide, red iron oxide, black iron oxide, azo red/yellow pigments, chrome yellow, phthalocyanine green, phthalocyanine blue, ultra marine blue, and quinacridone.

The coating composition can be prepared by a method known in the art such as kneading and dispersing incorporated components by using a ball mill, a pebble mill, a roll mill, a sand grind mill, a disper, etc.

While the coating composition can be used for various objects to be coated, such as plastics, metal, glass, foam, and their shaped articles, it can be used suitably for moldings (for example, automotive parts) made of plastics, such as polypropylene, polycarbonate, and ABS resin. The coating composition may be applied directly to the surface of an object to be coated, or in an alternative possible embodiment, a primer is applied to the surface of an object to be coated and then the coating composition is applied thereon in order to improve the adhesion between a coating film and the surface of the object to be coated. Moreover, a top coating such as a clear coating may further be applied thereon. The coating composition of the present invention can be used as a top coating such as a clear coating. The coating method is not particularly restricted and methods known in the art such as spray coating and a roll coater method can be used.

A coating film made of a coating composition containing a crosslinked polymer (A) and a crosslinking agent can be formed by baking (heating) an applied layer. The baking temperature is usually about 60 to about 100° C. and the baking time is about 3 to about 30 minutes. When forming a multilayer coating film, baking may be conducted for every layer or alternatively baking may be conducted only once after finishing the application of all layers.

A coating film made of a coating composition containing a crosslinked polymer (B) and a photopolymerization initiator can be formed by irradiating an applied layer with an energy ray. The method of the irradiation with an energy ray is not particularly restricted and the irradiation can be conducted in the conventional manner.

A crosslinked polymer obtained by the present invention can be used also as a filler for improving impact resistance, scratch resistance, and wear resistance. Appropriate introduction of an amino group, a carboxyl group, a sulfonic acid group, a phosphoric acid group, an amide bond, a urethane bond, etc. allows use for such applications as a pigment dispersant, an antisettling agent, and a viscosifying agent.

EXAMPLES

The present invention will be described in more detail by way of examples and comparative examples, but the invention is not limited to them.

[Preparation of Crosslinked Polymer]

Example 1

A glass separable flask equipped with a stirring blade, a temperature controller, a reflux condenser, a nitrogen inlet, and a dropping funnel was charged with 400.0 g of butyl acetate. Subsequently, the flask was purged with nitrogen, and then the temperature was raised to 95° C. Subsequently, at that temperature, a first mixture composed of 32.8 g of methyl methacrylate, 224.5 g of n-butyl acrylate, 71.8 g of n-butyl methacrylates, 116.0 g of hydroxyethyl methacrylate, 4.9 g of methacrylic acid, 50.0 g of trimethylolpropane trimethacrylate, 25.0 g of 2,2'-azobisisobutyronitrile, and 45.0 g of butyl acetate was added dropwise into a solvent contained in the flask continuously over 3 hours. After continuing a reaction at that temperature for one hour, a second mixture composed of 18.0 g of butyl acetate and 2.0 g of 2,2'-azobisisobutyronitrile was added dropwise over 30 minutes. After the completion of the dropping, the reaction liquid was kept at that temperature for 30 minutes and then cooled, so that solution A1 containing a crosslinked polymer was obtained.

Examples 2 to 12, Comparative Examples 1 to 14

Solutions each containing a crosslinked polymer, A2 to A12 (Examples 2 to 12) and H1 to H14 (Comparative Examples 1 to 14), were obtained by conducting a polymerization reaction in the same way as in Example 1 except that the type and the usage amount of the initially charged solvent (the solvent that is initially charged in a flask), the monomer, the solvent, and the radical polymerization initiator to constitute the first mixture, the solvent and the radical polymerization initiator to constitute the second mixture, the reaction temperature, and the reaction time are as shown in Table 1 (Examples) and Table 2 (Comparative Examples). As described later, in some comparative examples, a reaction liquid underwent gelation, so that a crosslinked polymer could not be obtained in a solution state. The reaction time indicated in Tables 1 and 2 is the time taken from the start of addition of the first mixture to the start of cooling of the reaction liquid. In Tables 1 and 2, the unit of the numerical values of the components to constitute each mixture is g (gram).

TABLE 1

| Example No. | | | 1 | 2 | 3 | 4 | 5 | 6 |
|---|---|---|---|---|---|---|---|---|
| Initially charged solvent | | MEK | | | | | | |
| | | AcBu | 400.0 | 400.0 | 400.0 | 400.0 | 280.0 | 280.0 |
| | | Solvesso 100 | | | | | | |
| | | PGM | | | | | | |
| First mixture | Monofunctional monomer | MMA | 32.8 | 34.6 | 32.8 | 31.0 | 32.8 | 23.3 |
| | | ST | | | | | | |
| | | nBA | 224.5 | 237.0 | 224.5 | 212.0 | 224.5 | 188.6 |
| | | nBMA | 71.8 | 75.6 | 71.8 | 67.8 | 71.8 | 60.5 |
| | | HEA | 116.0 | 122.4 | 116.0 | 109.5 | 116.0 | 97.7 |
| | | FM2D | | | | | | |
| | | FM5 | | | | | | |
| | | GMA | | | | | | |
| | | LMA | | | | | | |
| | | EA | | | | | | |
| | | AA | | | | | | |
| | | MAA | 4.9 | 5.2 | 4.9 | 4.7 | 4.9 | 4.9 |
| | Polyfunctional monomer | EGDA | | | | | | |
| | | TMPTA | | | | | | |
| | | EGDMA | | | | | | 50.0 | |
| | | TMPTMA | 50.0 | 25.0 | 50.0 | 75.0 | | 125.0 |
| | | D-TMP | | | | | | |
| | Solvent | MEK | | | | | | |
| | | IPA | | | | | | |
| | | AcBu | 45.0 | 45.0 | 45.0 | 45.0 | 30.0 | 30.0 |

TABLE 1-continued

| | | | | | | | | |
|---|---|---|---|---|---|---|---|---|
| | Initiator | Trigonox125 | | | | | | |
| | | tert-Butyl peroxybenzoate | | | | | | |
| | | tert-Butyl peroxyoctoate | | | | | | |
| | | AIBN | 25 | 25 | 25 | 25 | 25 | 25 |
| | Method for adding initial additive | | Continuation | ← | ← | ← | ← | ← |
| Second mixture | Solvent | MEK | | | | | | |
| | | IPA | | | | | | |
| | | AcBu | 18.0 | 18.0 | 18.0 | 18.0 | 18.0 | 18.0 |
| | Initiator | Trigonox125* | | | | | | |
| | | AIBN | 2.0 | 2.0 | 2.0 | 2.0 | 2.0 | 2.0 |
| Acid value | | mgKOH/g-solid | 6.4 | 6.8 | 6.4 | 6.1 | 6.4 | 6.4 |
| Hydroxyl value | | mgKOH/g-solid | 112.2 | 118.4 | 112.2 | 105.9 | 112.2 | 94.5 |
| Polyfunctional monomer content | | % (in all monomers) | 10.0 | 5.0 | 10.0 | 15.0 | 10.0 | 25.0 |
| Temperature | | (° C.) | 95 | 100 | 100 | 100 | 100 | 105 |
| Half-life of initiator | | (min.) | 14.7 | 8.4 | 8.4 | 8.4 | 8.4 | 4.8 |
| Solid content | | (%) | 52 | 52 | 52 | 52 | 60 | 60 |
| Reaction time | | (min.) | 300 | 300 | 300 | 300 | 300 | 300 |
| Property after polymerization | | | Transparent solution | ← | ← | ← | ← | ← |
| Weight average molecular weight | | GPC measurement result | 88200 | 22500 | 45500 | 85200 | 37700 | 188000 |

| | | Example No. | 7 | 8 | 9 | 10 | 11 | 12 |
|---|---|---|---|---|---|---|---|---|
| | Initially charged solvent | MEK | | | | | | |
| | | AcBu | 280.0 | 400.0 | 400.0 | 400.0 | | 400.0 |
| | | Solvesso 100 | | | | | | |
| | | PGM | | | | | 400.0 | |
| First mixture | Monofunctional monomer | MMA | 32.8 | 32.8 | 32.8 | 32.8 | 32.8 | 32.8 |
| | | ST | | | | | | |
| | | nBA | 224.5 | 224.5 | 224.5 | 224.5 | 224.5 | 224.5 |
| | | nBMA | 71.8 | 71.8 | 71.8 | 71.8 | 71.8 | 192.7 |
| | | HEA | 116.0 | 40.0 | 40.0 | | | |
| | | FM2D | | 76.0 | | | | |
| | | FM5 | | | 76.0 | | | |
| | | GMA | | | | 120.9 | | |
| | | LMA | | | | | | |
| | | EA | | | | | | |
| | | AA | | | | | | |
| | | MAA | 4.9 | 4.9 | 4.9 | | 120.9 | |
| | Polyfunctional monomer | EGDA | | | | | | |
| | | TMPTA | | | | | | |
| | | EGDMA | | | | | | |
| | | TMPTMA | | 50.0 | 50.0 | 50.0 | 50.0 | 50.0 |
| | | D-TMP | 50.0 | | | | | |
| | Solvent | MEK | | | | | | |
| | | IPA | | | | | | |
| | | AcBu | 30.0 | 45.0 | 45.0 | 45.0 | 45.0 | 45.0 |
| | Initiator | Trigonox125 | | | | | | |
| | | tert-Butyl peroxybenzoate | | | | | | |
| | | tert-Butyl peroxyoctoate | | | | | | |
| | | AIBN | 25 | 25 | 25 | 25 | 25 | 25 |
| | Method for adding initial additive | | ← | ← | ← | ← | ← | ← |
| Second mixture | Solvent | MEK | | | | | | |
| | | IPA | | | | | | |
| | | AcBu | 18.0 | 18.0 | 18.0 | 18.0 | 18.0 | 18.0 |
| | Initiator | Trigonox125* | | | | | | |
| | | AIBN | 2.0 | 2.0 | 2.0 | 2.0 | 2.0 | 2.0 |
| Acid value | | mgKOH/g-solid | 6.4 | 6.4 | 6.4 | 0.0 | 157.7 | 0.0 |
| Hydroxyl value | | mgKOH/g-solid | 112.2 | 23.8 | 12.2 | 0.0 | 0.0 | 0.0 |
| Polyfunctional monomer content | | % (in all monomers) | 10.0 | 10.0 | 10.0 | 10.0 | 10.0 | 10.0 |
| Temperature | | (° C.) | 105 | 100 | 100 | 100 | 100 | 100 |
| Half-life of initiator | | (min.) | 4.8 | 8.4 | 8.4 | 8.4 | 8.4 | 8.4 |
| Solid content | | (%) | 60 | 52 | 52 | 52 | 52 | 52 |
| Reaction time | | (min.) | 300 | 300 | 300 | 300 | 300 | 300 |
| Property after polymerization | | | ← | ← | ← | ← | ← | ← |
| Weight average molecular weight | | GPC measurement result | 166000 | 47400 | 42700 | 44000 | 44400 | 46300 |

*75% solution (solvent mineral spirit)

TABLE 2

| Comparative Example No. | | | 1 | 2 | 3 | 4 | 5 | 6 | 7 | 8 |
|---|---|---|---|---|---|---|---|---|---|---|
| Initially charged solvent | | MEK | | 500.0 | | | | | | |
| | | AcBu | 128.4 | | 400.0 | 400.0 | 400.0 | 400.0 | 400.0 | 400.0 |
| | | Solvesso 100 | 250.5 | | | | | | | |
| | | PGM | | | | | | | | |
| First mixture | Monofunctional monomer | MMA | 125.2 | 90.0 | 12.3 | 66.4 | 66.4 | 32.8 | 32.8 | 32.8 |
| | | nBA | | | 12.3 | 66.4 | 66.4 | 224.5 | 224.5 | 224.5 |
| | | nBMA | | 100.2 | | | | 71.8 | 71.8 | 71.8 |
| | | HEMA | 119 | | | | | 116.0 | 116.0 | 116.0 |
| | | FM2D | | | | | | | | |
| | | FM5 | | | | | | | | |
| | | GMA | | | | | | | | |
| | | LMA | 144 | | | | | | | |
| | | EA | 62.8 | | | | | | | |
| | | AA | 12.5 | | 7.0 | 37.8 | 37.8 | | | |
| | | MAA | | | | | | 4.9 | 4.9 | 4.9 |
| | Polyfunctional monomer | EGDA | | | | | | | | |
| | | TMPTA | | | 3.5 | 13.9 | 18.9 | | | |
| | | EGDMA | 62.0 | | | | | | | 50.0 |
| | | TMPTMA | | 10.0 | | | | | 50.0 | |
| | | D-TMP | | | | | | 50.0 | | |
| | Solvent | MEK | | 100.0 | | | | | | |
| | | IPA | | | | | | | | |
| | | AcBu | | | | | | 45.0 | 45.0 | 45.0 |
| | Initiator | Trigonox125 | | 5.0 | 1.4 | 7.6 | | | | |
| | | AIBN | | | (x6) | | 10 | 25 | 25 | 25 |
| | Method for adding initial additive | | Continuation | ← | Pulse | Continuation | ← | ← | ← | ← |
| Second mixture | Solvent | MEK | | | | | | | | |
| | | IPA | | | | | | | | |
| | | AcBu | | | | | | 9.0 | 18.0 | 18.0 | 18.0 |
| | Initiator | Trigonox125* | | 2.0 | 2.0 | 2.0 | | | | |
| | | tert-Butyl peroxybenzoate | 31.3 | | | | | | | |
| | | tert-Butyl peroxyoctoate | 12.5 | | | | | | | |
| | | AIBN | | | | | 1.0 | 2.0 | 2.0 | 2.0 |
| Acid value | mgKOH/g-solid | | 16.3 | 0.0 | 9.1 | 49.3 | 49.3 | 0.0 | 0.0 | 0.0 |
| Hydroxyl value | mgKOH/g-solid | | 102.7 | 0.0 | 0.0 | 0.0 | 0.0 | 100.1 | 100.1 | 100.1 |
| Polyfunctional monomer | % (in all monomers) | | 10.0 | 10.0 | 10.0 | 10.0 | 10.0 | 10.0 | 10.0 | 10.0 |
| Temperature | (° C.) | | 150 | 80 | 80 | 80 | 90 | 90 | 90 | 90 |
| Half-life of initiator | (min.) | | 2.2 | 22.6 | 22.6 | 22.6 | 26.3 | 26.3 | 26.3 | 26.3 |
| Solid content | (%) | | 60 | 15 | 34 | 32 | 32 | 52 | 52 | 52 |
| Reaction time | (min.) | | 360 | 510 | 780 | 300 | 300 | 300 | 300 | 300 |
| Property after polymerization | | | Transparent solution | ← | ← | Gelation | ← | ← | ← | ← |
| Weight average molecular | GPC measurement result | | 3500 | 22000 | 26000 | — | — | — | — | — |

| Comparative Example No. | | | 9 | 10 | 11 | 12 | 13 | 14 |
|---|---|---|---|---|---|---|---|---|
| Initially charged solvent | | MEK | | | | | | |
| | | AcBu | 400.0 | 400.0 | 400.0 | 400.0 | 400.0 | 400.0 |
| | | Solvesso 100 | | | | | | |
| | | PGM | | | | | | |
| First mixture | Monofunctional monomer | MMA | 32.8 | 32.8 | 36.1 | 23.8 | 32.8 | 32.8 |
| | | nBA | 224.5 | 224.5 | 247.0 | 161.5 | 224.5 | 224.5 |
| | | nBMA | 71.8 | 71.8 | 79.0 | 51.6 | 71.8 | 71.8 |
| | | HEMA | 116.0 | 116.0 | 127.8 | 83.4 | 116.0 | 116.0 |
| | | FM2D | | | | | | |
| | | FM5 | | | | | | |
| | | GMA | | | | | | |
| | | LMA | | | | | | |
| | | EA | | | | | | |
| | | AA | | | | | | |
| | | MAA | 4.9 | 4.9 | 5.4 | 4.8 | 4.9 | 4.9 |
| | Polyfunctional monomer | EGDA | | 50.0 | | | | |
| | | TMPTA | 50.0 | | | | | |
| | | EGDMA | | | | | | |
| | | TMPTMA | | | 3.0 | 175.0 | 50.0 | 50.0 |
| | | D-TMP | | | | | | |
| | Solvent | MEK | | | | | | |
| | | IPA | | | | | | |
| | | AcBu | 45.0 | 45.0 | 45.0 | 45.0 | 30.0 | 30.0 |
| | Initiator | Trigonox125 | | | | | | |
| | | AIBN | 25 | 25 | 25 | 25 | 25 | 25 |
| | Method for adding initial additive | | ← | ← | ← | ← | ← | ← |

TABLE 2-continued

| | | | | | | | | |
|---|---|---|---|---|---|---|---|---|
| Second mixture | Solvent | MEK | | | | | | |
| | | IPA | | | | | | |
| | | AcBu | 18.0 | 18.0 | 18.0 | 18.0 | 18.0 | 18.0 |
| | Initiator | Trigonox125* | | | | | | |
| | | tert-Butyl peroxybenzoate | | | | | | |
| | | tert-Butyl peroxyoctoate | | | | | | |
| | | AIBN | 2.0 | 2.0 | 2.0 | 2.0 | 2.0 | 2.0 |
| Acid value | | mgKOH/g-solid | 0.0 | 0.0 | 0.0 | 0.0 | 6.4 | 6.4 |
| Hydroxyl value | | mgKOH/g-solid | 100.1 | 100.1 | 110.1 | 83.4 | 100.1 | 100.1 |
| Polyfunctional monomer | | % (in all monomers) | 10.0 | 10.0 | 1.0 | 35.0 | 10.0 | 10.0 |
| Temperature | | (° C.) | 100 | 100 | 100 | 100 | 110 | 115 |
| Half-life of initiator | | (min.) | 8.4 | 8.4 | 8.4 | 8.4 | 2.8 | 1.7 |
| Solid content | | (%) | 52 | 52 | 52 | 52 | 53 | 53 |
| Reaction time | | (min.) | 300 | 300 | 300 | 300 | 300 | 300 |
| Property after polymerization | | | ← | ← | Transparent solution | Gelation | Transparent solution | ← |
| Weight average molecular | | GPC measurement result | — | — | 8800 | — | 12500 | 9600 |

The meaning of abbreviations given in Tables 1 and 2 is as follows:

(1) MEK: methyl ethyl ketone,
(2) AcBu: butyl acetate,
(3) PGM: propylene glycol monomethyl ether,
(4) IPA: isopropyl alcohol,
(5) MMA: methyl methacrylate (molecular weight: 100),
(6) nBA: n-butyl acrylate (molecular weight: 128),
(7) nBMA: n-butyl methacrylate (molecular weight: 142),
(8) HEMA: 2-hydroxyethylmethacrylate (molecular weight: 130)
(9) FM2D: polycaprolactone macromer having a molecular weight of 358, represented by the following formula:

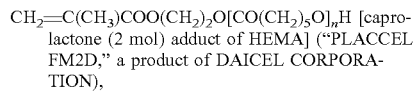

$CH_2=C(CH_3)COO(CH_2)_2O[CO(CH_2)_5O]_nH$ [caprolactone (2 mol) adduct of HEMA] ("PLACCEL FM2D," a product of DAICEL CORPORATION),

(10) FM5: polycaprolactone macromer having a molecular weight of 701, represented by the following formula:

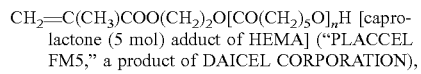

$CH_2=C(CH_3)COO(CH_2)_2O[CO(CH_2)_5O]_nH$ [caprolactone (5 mol) adduct of HEMA] ("PLACCEL FM5," a product of DAICEL CORPORATION),

(11) GMA: glycidyl methacrylate (molecular weight: 142),
(12) EHA: 2-ethylhexyl acrylate (molecular weight: 184)
(13) EHMA: 2-ethylhexyl methacrylate (molecular weight: 198)
(14) LMA: lauryl methacrylate (molecular weight: 254)
(15) AA: acrylic acid,
(16) MAA: methacrylic acid,
(17) EGDA: ethylene glycol diacrylate,
(18) TMPTA: trimethylolpropane triacrylate,
(19) EGDMA: ethylene glycol dimethacrylate,
(20) TMPTMA: trimethylolpropane trimethacrylate,
(21) D-TMP: ditrimethylolpropane tetramethacrylate (a product of Shin-Nakamura Chemical Co., Ltd.),
(22) Trigonox: 75 wt % solution of tert-amyl peroxypivalate in mineral spirit solution ("Trigonox125-C75," a product of AkzoNobel N.V.),
(23) AIBN: 2,2'-azobisisobutyronitrile.

Comparative Examples 1 to 3

Comparative Example 1 is a supplementary experiment of Example 1 disclosed in the above-mentioned Patent Document 3 and a polymerization reaction was conducted in accordance with the method described in the document. Comparative Example 2 is a supplementary experiment of Example 2 disclosed in the above-mentioned Patent Document 1 and a polymerization reaction was conducted in accordance with the method described in the document. Comparative Example 3 is a supplementary experiment of Example 1 disclosed in the above-mentioned Patent Document 2 and the addition of the first mixture was conducted in six portions at 90-minute intervals.

For each of Examples and Comparative Examples, the half-life (min) of the radical polymerization initiator under the polymerization reaction conditions, the content (% by weight) of a polyfunctional monomer in the whole monomer, the acid value and the hydroxyl value (mgKOH/g-solid) of the resulting crosslinked polymer, and the solid content (% by weight) and the properties of the resulting crosslinked polymer-containing liquid (the reaction liquid after polymerization) are summarized in Table 1 and Table 2. The measurement or calculation thereof was conducted as follows.

[1] Half-life of Radical Polymerization Initiator

The half-life of a radical polymerization initiator was calculated by substituting the reaction temperature of the polymerization reaction into the definition formula provided above.

[2] Content of Polyfunctional Monomer

The content of a polyfunctional monomer was calculated from the amount of the monomer charged.

[3] Acid Value and Hydroxyl Value of Crosslinked Polymer

Potentiometric titration was conducted using a 1% by weight solution of phenolphthalein in ethanol as an indicator and a 0.1N solution of potassium hydroxide in isopropanol as a titrant and then the acid value of a crosslinked polymer was calculated on the basis of the calculation formula:

$$\text{Acid value (mgKOH/g)} = [N \times 56.1 \times F \times (V - V_0)] / [W \times A \times 0.01].$$

In the above formula, N is the normality of the potassium hydroxide solution, F is the factor of the potassium hydroxide solution, V is the amount (ml) of the potassium hydroxide solution needed for the titration, $V_0$ is the amount (ml) of the potassium hydroxide solution needed for the titration of the solvent, W is the mass (g) of the sample (the crosslinked polymer-containing liquid), and A is the solid content (% by weight) of the sample.

The hydroxyl value of a crosslinked polymer was calculated from the amount of the monomer charged on the basis of the calculation formula:

Hydroxyl value (mgKOH/g)=[Y×56100]/[100×Mw].

In the above formula, Y is the content (% by weight) of a hydroxyl group-containing monomer in the whole monomer and Mw is the molecular weight of the hydroxyl group-containing monomer.

[4] Solid Content of Crosslinked Polymer-containing Liquid (Reaction Liquid after Polymerization)

About 2 g of a crosslinked polymer-containing liquid was weighed precisely in a tin-plated cylindrical container of about 5 cm in diameter and about 1 cm in height and then was dried for 1 hour in a hot air drying furnace at 150° C. The residue after the drying was weighed precisely, and then the solid content (% by weight) was calculated on the basis of the formula:

Solid content (% by weight)=100×[the weight (g) of the residue after the drying]/[the weight (g) of the crosslinked polymer-containing liquid].

[5] Properties of Reaction Liquid after Polymerization

Visual check was conducted. The case where a transparent solution was found was judged as transparent solution and the case where gelation occurred was judged as gelation.

[6] Weight Average Molecular Weight

Measurement was conducted using HLC-8220GPC, a product of TOSOH Corporation. The measurement conditions are as follows:
Column: TSKgel Super Multipore HZ-M, three columns
Developing solvent: tetrahydrofuran
Column inlet oven: 40° C.
Flow rate: 0.35 ml/min
Detector: RI
Standard polystyrene: PS oligomer kit, a product of TOSOH Corporation In every Example, a high-solids crosslinked polymer-containing solution having a crosslinked polymer concentration (solid content) of over 50% by weight could be obtained. In contrast to this, it was confirmed that an attempt to achieve a high solid content results in the occurrence of gelation when a polymerization reaction is conducted under conditions such that the half-life of the radical polymerization initiator does not become 18 minutes or less, or when no polyfunctional methacrylate is used as a polyfunctional monomer, or when the content of a polyfunctional monomer exceeds 30% by weight (Comparative Examples 1 to 7, and 9).

A resin having a high molecular weight could not be obtained in Comparative Example 1 (a supplementary experiment of Example 1 disclosed in Patent Document 1), in which a polymerization reaction was conducted under conditions such that the half-life was less than 4 minutes.

In Comparative Example 3 (a supplementary experiment of Example 1 disclosed in Patent Document 2), a pulse addition method was used and a relatively high-solids crosslinked polymer-containing solution could be obtained; problems with the pulse addition method are as described above. As can be understood from Comparative Example 8, a high-solids crosslinked polymer-containing solution can be obtained even if the content of a polyfunctional monomer is less than 2% by weight. As described later, however, such a crosslinked polymer having an extremely low content of a polyfunctional monomer cannot afford good coating film properties when using the polymer for a coating composition.

[Preparation of Active Energy Ray-curable Crosslinked Polymer]

Example 13

After preparing a crosslinked polymer-containing solution by the same method as in Example 10, the solution was heated to 120° C. and then kept at this temperature for 3 hours. Subsequently, the temperature was adjusted to 100° C. Subsequently, 0.3 g of methoxyhydroquinone and 2.1 g of triphenylphosphine were added. Subsequently, a mixture composed of 55.2 g of acrylic acid and 92.2 g of butyl acetate was added dropwise over 2 hours. After the completion of the dropping, a reaction was continued for additional 6 hours, so that solution B1 containing an active energy ray-curable crosslinked polymer was obtained. The acid value of the resulting active energy ray-curable crosslinked polymer was 0.5 mgKOH/g.

Example 14

After preparing a crosslinked polymer-containing solution by the same method as in Example 11, the solution was heated to 120° C. and then kept at this temperature for 3 hours. Subsequently, the temperature was adjusted to 100° C. Subsequently, 0.3 g of methoxyhydroquinone and 2.6 g of tetrabutylphosphonium bromide were added. Subsequently, a mixture composed of 177.6 g of glycidyl methacrylate and 214.6 g of butyl acetate was added dropwise over 2 hours. After the completion of the dropping, a reaction was continued for additional 6 hours, so that solution B2 containing an active energy ray-curable crosslinked polymer was obtained. The acid value of the resulting active energy ray-curable crosslinked polymer was 14 mgKOH/g.

Comparative Example 15

A glass separable flask equipped with a stirring blade, a temperature controller, a reflux condenser, a nitrogen inlet, and a dropping funnel was charged with 400.0 g of butyl acetate. Subsequently, the flask was purged with nitrogen, and then the temperature was raised to 100° C. Subsequently, at that temperature, a first mixture composed of 82.8 g of methyl methacrylate, 224.5 g of n-butyl acrylate, 71.8 g of n-butyl methacrylate, 120.9 g of methacrylic acid, 25.0 g of azobisisobutyronitrile, and 45.0 g of butyl acetate was continuously added dropwise to the solvent contained in the flask over 3 hours. After continuing a reaction at that temperature for one hour, a second mixture composed of 18.0 g of butyl acetate and 2.0 g of azobisisobutyronitrile was added dropwise over 30 minutes. After the dropping, the resultant was kept at that temperature for 30 minutes, then was heated to 120° C., and then was kept at this temperature for 3 hours. Subsequently, the temperature was adjusted to 100° C. Subsequently, 0.3 g of methoxyhydroquinone and 2.6 g of tetrabutylphosphonium bromide were added. Subsequently, a mixture composed of 177.6 g of glycidyl methacrylate and 214.6 g of butyl acetate was added dropwise over 2 hours. After the completion of the dropping, a reaction was continued for additional 6 hours, so that solution H-16 containing an active energy ray-curable non-crosslinked polymer was obtained. The acid value of the resulting active energy ray-curable non-crosslinked polymer was 14 mgKOH/g.

[Preparation of Coating Composition]

Examples 15 to 25, Comparative Examples 16 to 23

Coating compositions (base coatings) were prepared by mixing components with a high speed disper in accordance with the formulation (parts by weight) given in Tables 3 and 4.

(2) Acrylic resin: "DIANAL LR-2642," a product of Mitsubishi Rayon Co., Ltd., (3) Aluminum pigment: "ALPASTE 65-388N," a product of Toyo Aluminium K.K.

(4) Viscosity control agent: crosslinking resin particle solution prepared in accordance with the following Production Example 1,

TABLE 3

|  | Example 15 | Example 16 | Example 17 | Example 18 | Example 19 | Example 20 | Example 21 | Example 22 | Example 23 | Example 24 | Example 25 |
|---|---|---|---|---|---|---|---|---|---|---|---|
| Viscosity control agent (material of Production Example 1) | 11.80 | ← | ← | ← | ← | ← | ← | ← | ← | ← | ← |
| Toluene | 4.88 | ← | ← | ← | ← | ← | ← | ← | ← | ← | ← |
| Xylene | 7.63 | ← | ← | ← | ← | ← | ← | ← | ← | ← | ← |
| Acrylic resin | 7.87 | ← | ← | ← | ← | ← | ← | ← | ← | ← | ← |
| Antisettling agent | 8.42 | ← | ← | ← | ← | ← | ← | ← | ← | ← | ← |
| Solvesso 150 | 2.80 | ← | ← | ← | ← | ← | ← | ← | ← | ← | ← |
| Material of Production Example 2 | 0.40 | ← | ← | ← | ← | ← | ← | ← | ← | ← | ← |
| Aluminum pigment | 6.87 | ← | ← | ← | ← | ← | ← | ← | ← | ← | ← |
| Ethyl acetate | 6.92 | ← | ← | ← | ← | ← | ← | ← | ← | ← | ← |
| Non-crosslinked acrylic polyol resin | 0.00 | ← | ← | ← | ← | ← | ← | ← | ← | ← | ← |
| Crosslinked resin | Example 1 | Example 2 | Example 3 | Example 4 | Example 5 | Example 6 | Example 7 | Example 6 | Example 8 | Example 9 | Example 12 |
|  | 32.67 | 32.67 | 32.67 | 32.67 | 31.46 | 31.46 | 31.46 | 28.84 | 32.67 | 32.67 | 32.67 |
| Duranate K6000, a product of Asahi Kasei Corporation (Block isocyanate) | 0.00 | 0.00 | 0.00 | 0.00 | 0.00 | 0.00 | 0.00 | 2.62 | 0.00 | 0.00 | 0.00 |
| Ethyl acetate | 10.00 | 10.00 | 10.00 | 10.00 | 10.00 | 10.00 | 10.00 | 10.00 | 10.00 | 10.00 | 10.00 |
| Peel test result (initial) | ○ | ○ | ○ | ○ | ○ | ○ | ○ | ○ | ○ | ○ | ○ |
| Accelerated weatherability Gloss retention | ○ | ○ | ○ | ○ | ○ | ○ | ○ | ○ | ○ | ○ | ○ |
| Color difference | ○ | ○ | ○ | ○ | ○ | ○ | ○ | ○ | ○ | ○ | ○ |
| Peel test result | ○ | ○ | ○ | ○ | ○ | ○ | ○ | ○ | ○ | ○ | ○ |

TABLE 4

|  | Comparative Example 16 | Comparative Example 17 | Comparative Example 18 | Comparative Example 19 | Comparative Example 20 | Comparative Example 21 | Comparative Example 22 |
|---|---|---|---|---|---|---|---|
| Viscosity control agent (material of Production Example 1) | 11.80 | ← | ← | ← | ← | ← | ← |
| Toluene | 4.88 | ← | ← | ← | ← | ← | ← |
| Xylene | 7.63 | ← | ← | ← | ← | ← | ← |
| Acrylic resin | 7.87 | ← | ← | ← | ← | ← | ← |
| Antisettling agent | 8.42 | ← | ← | ← | ← | ← | ← |
| Solvesso 150 | 2.80 | ← | ← | ← | ← | ← | ← |
| Aluminum-dispersing resin | 0.40 | ← | ← | ← | ← | ← | ← |
| Aluminum pigment | 6.87 | ← | ← | ← | ← | ← | ← |
| Ethyl acetate | 6.92 | ← | ← | ← | ← | ← | ← |
| Non-crosslinked acrylic polyol resin | 23.60 | ← | ← | ← | ← | ← | ← |
| Crosslinked resin | — | — | — | Comparative Example 1 | Comparative Example 11 | Comparative Example 13 | Comparative Example 14 |
|  | 0.00 | 0.00 | 0.00 | 31.46 | 31.46 | 31.46 | 31.46 |
| Duranate K6000, a product of Asahi Kasei Corporation (Block isocyanate) | 7.86 | 2.62 | 0.00 | 0.00 | 0.00 | 0.00 | 0.00 |
| Ethyl acetate | 10.00 | 10.00 | 10.00 | 10.00 | 10.00 | 10.00 | 10.00 |
| Peel test result (initial) | ○ | Δ | x | Δ | x | ○ | ○ |
| Accelerated weatherability Gloss retention | ○ | Δ | x | Δ | x | Δ | Δ |
| Color difference | ○ | Δ | x | Δ | Δ | ○ | Δ |
| Peel test result | Δ | x | x | Δ | x | Δ | Δ |

The details of incorporated components given in Tables 3 and 4 are as follows:

(1) Acrylic polyol resin: "COATAX A-200" (non-crosslinked acrylic polyol resin, hydroxyl value: 100 mgKOH/g-solid), a product of Toray Fine Chemicals Co., Ltd., (5) Resin for aluminum dispersion: phosphoric acid group-containing acrylic resin solution prepared in accordance with the following Production Example 2, (6) Antisettling agent: "DISPARLON 6901-20X," a product of Kusumoto Chemicals, Ltd.

(7) Isocyanate type curing agent: "DURANATE K6000" (block isocyanate), a product of Asahi Kasei Corporation.

Production Example 1

Preparation of Viscosity Control Agent

A reaction vessel equipped with an stirring-heating apparatus, a thermometer, a nitrogen introducing tube, a condenser, and a decanter was charged with 213 parts by weight of bishydroxyethyltaurine, 208 parts by weight of neopentyl glycol, 296 parts by weight of phthalic anhydride, 376 parts by weight of azelaic acid, and 30 parts by weight of xylene, followed by heating. Water produced by the reaction was removed together with xylene by azeotropic distillation. After starting refluxing, the reaction temperature was adjusted to 210° C. over about 3 hours, and then agitation and dehydration were continued until an acid value corresponding to a carboxylic acid reached 135 mgKOH/g-solid. After cooling to 140° C., 500 parts by weight of versatic acid glycidyl ester ("Carjura E10," a product of SHELL) was added dropwise over 30 minutes, and thereafter agitation was continued for about 2 hours, affording an amphoteric ion group-containing polyester resin having an acid value of 55 mgKOH/g-solid, a hydroxyl value of 91 mgKOH/g-solid, and a number average molecular weight of 1250.

Subsequently, 10 parts by weight of the amphoteric ion group-containing polyester resin, 140 parts by weight of deionized water, 1 part by weight of dimethylethanolamine, 50 parts by weight of styrene, and 50 parts by weight of ethylene glycol dimethacrylate were intensively agitated in a stainless steel beaker to prepare a monomer suspension. On the other hand, an aqueous solution of an initiator was prepared by mixing 0.5 parts by weight of azobiscyanovaleric acid, 40 parts by weight of deionized water, and 0.32 parts by weight of dimethylethanolamine.

A reaction vessel equipped with an stirring-heating apparatus, a thermometer, a nitrogen introducing tube, and a condenser was charged with 5 parts by weight of the amphoteric ion group-containing polyester resin, 280 parts by weight of deionized water, and 0.5 parts by weight of dimethylethanolamine, followed by heating to 80° C. After 251 parts by weight of the monomer suspension and 40.82 parts by weight of the aqueous solution of the initiator were simultaneously added dropwise thereto over 60 minutes, the reaction was continued for 60 minutes, affording an emulsion of a crosslinked resin particle having a particle size of 55 nm as measured by a dynamic light scattering method. After xylene was added to the crosslinked resin particle emulsion, water was removed by azeotropic distillation under reduced pressure to replace the solvent with xylene, so that a solution of the crosslinked resin particle in xylene with a solid content of 20% by weight was prepared.

Production Example 2

Preparation of Resin for Aluminum Dispersion

A 1-liter reaction vessel equipped with a stirrer, a temperature regulator, and a condenser was charged with 40 parts by weight of ethoxypropanol, and then 121.7 parts by weight of a monomer solution composed of 4 parts by weight of styrene, 35.96 parts by weight of n-butyl acrylate, 18.45 parts by weight of ethylhexyl methacrylate, 13.92 parts by weight of 2-hydroxyethyl methacrylate, 7.67 parts by weight of methacrylic acid, 40 parts by weight of a 50% by weight solution of acid phosphoxyhexa(oxypropylene) monomethacrylate ("Phosmer PP," a product of Uni Chemical Co., Ltd.) in ethoxypropanol, and 1.7 parts by weight of azobisisobutyronitrile was added dropwise thereto at 120° C. over 3 hours. Agitation was continued for additional one hour, affording a resin for aluminum dispersion, which was a phosphoric acid group-containing acrylic resin solution.

[Evaluation of Coating Film]

In the following procedures, test pieces with coating films formed from the coating compositions (base coatings) of the above-described Examples 15 to 25 and Comparative Examples 17 to 24 were prepared and then subjected to evaluating tests for the items given below. The evaluation results are shown in Tables 3 and 4. The method for the preparation of the test pieces is as follows. First, a primer ("R-357CD-1-U-AJ3," a product of Nippon Bee Chemical Co., Ltd.) was applied to a polypropylene substrate wiped with isopropanol so that the dry film thickness might become 5 to 10 μm, and then a base coating was applied so that the dry film thickness might become 30 to 35 μm. Moreover, a clear coating ("R-2500-1," a product of Nippon Bee Chemical Co., Ltd.) was applied so that the dry film thickness might become 20 to 25 μm. After leaving at rest at room temperature for 10 minutes, baking was conducted at 90° C. for 20 minutes to afford a test piece.

(1) Adhesion (Peel Test)

A peel test was conducted in the following procedures using a test piece allowed to stand for 24 hours after its preparation.

Procedure 1: One hundred square cells were formed on a test piece with a retractable knife by making 11 longitudinal incisions at 2-mm intervals and also making 11 transverse incisions at 2-mm intervals so as to intersect the former incisions perpendicularly.

Procedure 2: A cellophane tape is stuck firmly on the incisions and then the cellophane tape is rapidly pulled at an angle of 45° to peel from the test piece.

Procedure 3: The operation of Procedure 2 is repeated three times in total.

The peeled sites of the coating film after the execution of Procedure 3 were visually observed; when zero cell was peeled away, this was indicated by ○, when 1 to 10 cells were peeled away, this was indicated by Δ, and when 11 or more cells were peeled away, this was indicated by ×. The evaluation results are shown in Tables 3 and 4 (the peel test results (initial) in the tables).

<Evaluation of Accelerated Weatherability>

Gloss retention (%), color difference, and adhesion were evaluated with a xenon weather meter. The testing conditions are as follows:

Illumination: 100 W/m$^2$

Time: 1000 hours

Optical filter: inner Quartz; outer #295

Black panel temperature: 63° C.

Rain cycle: a cycle including irradiation for 102 minutes, and irradiation and raining for 18 minutes The evaluation criteria are as follows.

Peel Test

The test was conducted in the same way as in the initial peel test.

Gloss Retention

Calculated from a secular surface gloss value at 60°. Gloss retention (%)=(gloss value after test)/(gloss value before test)×100

○: Not less than 80%

Δ: Not less than 70%

×: Not more than 70%

Color Difference

Color difference (ΔE) between before a colorimetric test and after the colorimetric test was evaluated by using an angle-adjustable spectrophotometric color meter CM-512M3 (a product of Konica Minolta Co., Ltd.).
○: ΔE=not more than 3
Δ: ΔE=not more than 5
×: ΔE=not less than 5

[Preparation of Active Energy Ray-Curable Coating Composition]

Examples 26 to 31, Comparative Examples 27 to 32

An active energy ray-curable coating composition was prepared by mixing components with a high speed disper in accordance with the formulation (parts by weight) given in Table 5 using the solution containing the active energy ray-curable polymer of the above-described Example 13, Example 14, or Comparative Example 15. The photopolymerization initiator indicated in the table is "Irgacure 184" (1-hydroxycyclohexyl phenyl ketone), a product of Ciba Specialty Chemicals.

TABLE 5

| | | Example 26 | Example 27 | Example 28 | Example 29 | Example 30 | Example 31 | Comparative Example 23 | Comparative Example 24 | Comparative Example 25 |
|---|---|---|---|---|---|---|---|---|---|---|
| Photocurable resin | Example 13 | 120 | 120 | 120 | | | | | | |
| | Example 14 | | | | 120 | 120 | 120 | | | |
| | Comparative Example 15 | | | | | | | 120 | 120 | 120 |
| Pentaerythritol triacrylate | | 40 | 40 | 40 | 40 | 40 | 40 | 40 | 40 | 40 |
| Irgacure 184 | | 6 | 4 | 2 | 6 | 4 | 2 | 6 | 4 | 2 |
| Ethyl acetate | | 240 | 240 | 240 | 240 | 240 | 240 | 240 | 240 | 240 |
| Pencil hardness | Exposure 800 mj/cm$^2$ | 2H | H | H | H | H | H | HB | HB | B |
| | Exposure 400 mj/cm$^2$ | H | H | F | H | F | F | B | B | 2B |

It was confirmed that the coating compositions prepared using the active energy ray-curable crosslinked polymers of Examples 13 and 14 were superior in curability to the coating compositions prepared using the active energy ray-curable non-crosslinked polymer of Comparative Example 15 (in other words, were capable of affording a coating film having high hardness even with a reduced usage amount of a photopolymerization initiator or a reduced exposure). It was found that with the same usage amount of a photopolymerization initiator and the same exposure (light exposure), the coating compositions prepared using the active energy ray-curable crosslinked polymers of Examples 13 and 14 can form coating films with higher hardness than the coating composition prepared using the active energy ray-curable non-crosslinked polymer of Comparative Example 15.

The invention claimed is:

1. A method for producing a crosslinked polymer in a reaction liquid without gelation, the crosslinked polymer having a weight average molecular weight of 15000 to 200000, the method comprising:
    a step [I] of obtaining a crosslinked polymer (A) by conducting a polymerization of a monomer composition comprising 2 to 30% by weight of a polyfunctional methacrylate having 2 to 4 functional groups (a) and 98 to 70% by weight of one or more polymerizable monomers selected from the group consisting of monofunctional (meth)acrylates, (meth)acrylic acid, and monofunctional vinyl aromatic compounds (b) in an organic solvent, in the presence of a radical polymerization initiator, and in a temperature region where the half-life of the radical polymerization initiator is from 4 to 18 minutes;
    wherein the concentration of the crosslinked polymer in the reaction liquid after completion of the step (I) is 50% or more, by weight.

2. The method for producing a crosslinked polymer according to claim 1, wherein the one or more polymerizable monomers selected from the group consisting of monofunctional (meth)acrylates, (meth)acrylic acid, and monofunctional vinyl aromatic compounds (b) comprises a compound selected from the group consisting of (meth)acrylates having a molecular weight of less than 160, (meth)acrylic acid, and styrene in an amount of 82% by weight or more.

3. The method for producing a crosslinked polymer according to claim 1, wherein the crosslinked polymer has one or more kinds of functional group selected from the group consisting of a hydroxy group and a carboxyl group and the content of the functional group is 10 to 160 mgKOH/g as expressed in hydroxyl value or acid value.

4. The method for producing a crosslinked polymer according to claim 1, wherein the organic solvent is a solvent capable of dissolving the monomer composition and the crosslinked polymer.

5. The method for producing a crosslinked polymer according to claim 1, wherein the method further comprises step [II] of obtaining an active energy ray-curable crosslinked polymer (B) by reacting a compound having a reactive functional group capable of undergoing addition reaction to the crosslinked polymer (A) and a radically polymerizable double bond (c) with the crosslinked polymer (A) after the step [I].

6. A crosslinked polymer that is a crosslinked polymer (A) obtained by the method for producing a crosslinked polymer according to claim 1.

7. A crosslinked polymer that is a crosslinked polymer (B) obtained by the method for producing a crosslinked polymer according to claim 5.

8. A crosslinked polymer-containing liquid comprising a crosslinked polymer (A) obtained by the method for producing a crosslinked polymer according to claim 1.

9. A crosslinked polymer-containing liquid comprising a crosslinked polymer (B) obtained by the production method according to claim 5.

10. A coating composition comprising a crosslinked polymer according to claim 6.

11. A coating composition comprising a crosslinked polymer according to claim 7.

12. The method for producing a crosslinked polymer according to claim 2, wherein the crosslinked polymer has one or more kinds of functional group selected from the group consisting of a hydroxy group and a carboxyl group and the content of the functional group is 10 to 160 mgKOH/g as expressed in hydroxyl value or acid value.

13. The method for producing a crosslinked polymer according to claim 2, wherein the organic solvent is a solvent capable of dissolving the monomer composition and the crosslinked polymer.

14. The method for producing a crosslinked polymer according to claim 2, wherein the method further comprises step [II] of obtaining an active energy ray-curable crosslinked polymer (B) by reacting a compound having a reactive functional group capable of undergoing addition reaction to the crosslinked polymer (A) and a radically polymerizable double bond (c) with the crosslinked polymer (A) after the step [I].

15. A crosslinked polymer that is a crosslinked polymer (A) obtained by the method for producing a crosslinked polymer according to claim 2.

16. A crosslinked polymer that is a crosslinked polymer (B) obtained by the method for producing a crosslinked polymer according to claim 14.

17. A crosslinked polymer-containing liquid comprising a crosslinked polymer (A) obtained by the method for producing a crosslinked polymer according to claim 2.

18. A crosslinked polymer-containing liquid comprising a crosslinked polymer (B) obtained by the method for producing a crosslinked polymer according to claim 14.

19. A coating composition comprising a crosslinked polymer according to claim 15.

20. A coating composition comprising a crosslinked polymer according to claim 16.

* * * * *